INVENTOR
J. FLINN
B. T. SCOFIELD
BY
AGENT

United States Patent Office 3,188,284
Patented June 8, 1965

3,188,284
METHOD OF ETCHING BODIES
Ian Flinn, Bucks, and Brian Thomas Scofield, Linkfield Corner, Redhill, England, assignors to North American Philips Company, Inc., New York, N.Y., a corporation of Delaware
Filed Nov. 12, 1959, Ser. No. 852,481
Claims priority, application Great Britain, Feb. 26, 1959, 6,711/59
3 Claims. (Cl. 204—143)

This invention relates to a method of etching the surface of a body, for example, a semi-conductor body.

According to the invention, there is provided a method of etching the surface of a body and simultaneously measuring the reduction in thickness of the body, comprising the steps of directing etchant under pressure on to the surface of the body from a jet arranged close to the body, indicating, as the body is etched, the reduction in the pressure required to force the etchant through the channel defined by the jet and the surface of the body, and deriving from such indication the reduction in thickness of the body.

In one embodiment of the invention, the jet and body are maintained stationary and the indication of the reduction in the pressure required to force the etchant through the channel defined by the jet and the surface of the body can be used to derive directly the measurement of the reduction in thickness of the body. For example, the reduction may be read off a manometer adapted to measure the pressure of the etchant issuing from the jet, the manometer being previously calibrated to give values for the separation of the jet face and surface of the body. However, in a preferred embodiment, after such indication of pressure reduction, relative movement of the body towards the jet is effected to maintain the pressure of the etchant substantially constant, the relative approach of the body towards the jet corresponding to the reduction in thickness. To obtain the best sensitivity the jet preferably has a flat end face parallel to the surface of the body to be etched.

The method according to the invention is particularly suitable for etching semi-conductor bodies, such as germanium, and it is preferred to etch such semi-conductor bodies electrolytically.

The semi-conductor may be p-type germanium and the etchant an aqueous sodium hydroxide solution. The same etchant may be used for n-type germanium but it is necessary in this case to illuminate the surface of the germanium to be etched to obtain satisfactory results.

Embodiments of the invention will now be described, by way of example, with reference to the accompanying diagrammatic drawing in which.

Figure 1:
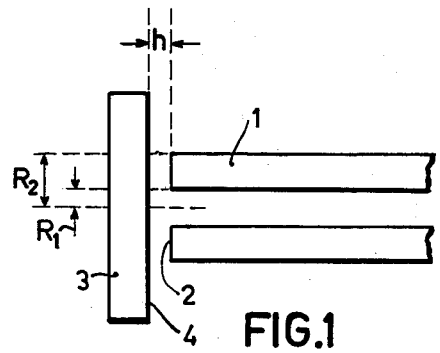
FIGURE 1 shows a sectional view through the jet and a semi-conductor body.

Referring to FIGURE 1, this shows a glass jet 1 of inner radius $R_1$ and outer radius $R_2$, one end being ground to form a flat face 2. The germanium semi-conductor body 3 in the form of a flat plate is mounted on a micrometer slide so that its surface 4 to be etched is parallel to the face 2 and close to it at a distance $h$ away.

The pressure P needed to force Q ccs. per second of liquid of viscosity $n$ poises through the channel formed by the face 2 and the surface 4 of body 3, where $g$ is the usual acceleration due to gravity, is given by Schiller (Z. tech. Phys. 2, 50) as $$P = \frac{6nQ \log_e \frac{R_2}{R_1}}{\pi g h^3} \text{ cm. water}$$

In accordance with the method of the present invention, as the surface of the semi-conductor body 3 is etched the latter is moved relatively towards the jet 1, in this embodiment by moving the body 3, to maintain P constant. The distance $h$ is thus maintained constant and the approach of the body 3 towards the jet 1 is equal to the thickness of the germanium removed by the etching.

Figure 2:
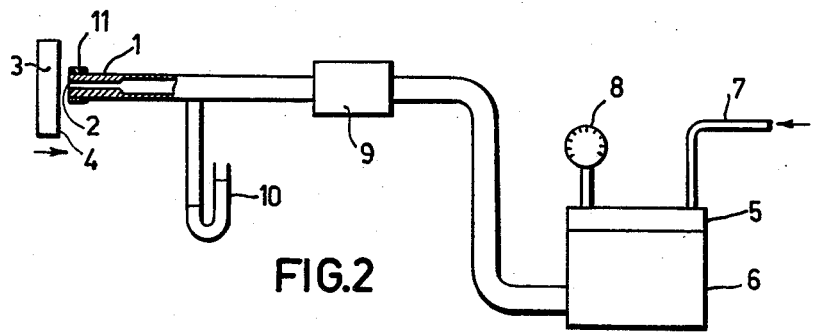
FIGURE 2 shows schematically the complete apparatus for the etching of p-type germanium.

Referring now to FIGURE 2, reference numeral 5 designates a container containing as the electrolyte 6, 20% sodium hydroxide solution. The sodium hydroxide is maintained under pressure by compressed air through pipe 7. The pressure is maintained at about 60 lbs. per sq. in. as indicated on pressure gauge 8. The electrolyte is fed through a capillary schematically represented at 9 to give a substantially constant rate of flow of liquid through the jet 1 and the pressure drop in the channel between the jet face 2 and the surface 4 of the body 3 is measured by a water manometer 10. For the etching, the cathode is provided by platinum foil 11 wrapped around the outer cylindrical surface of the jet 1 near its orifice and the germanium body 3 itself constitutes the anode. The germanium body 3 is soldered to a copper strip (not shown) attached to a micrometer slide (also not shown).

As the etching takes place the pressure drop in the channel defined by the jet face 2 and the surface 4 of the body 3 falls, the change in pressure being indicated by the manometer 10. This change is sensed, either automatically or by observation of the manometer 10 by an operator, and to derive from such indication the reduction in thickness of the body 3, the latter is moved towards the jet until the initial pressure is recorded and in this way the pressure of the etchant is maintained substantially constant. The movement of the body 3 is equal to the thickness of the body etched. The germanium body 3 is moved until the desired degree of etch has been obtained as indicated by the micrometer. The thickness of the germanium removed can be monitored continuously to an accuracy of ±2 microns.

The details of the electrolytic etching are as follows:

Pressure at the manometer 10, maintained constant to within 0.5 mm. by movement of the germanium body _____ 10. cms. of water.
Current density _____ 250 ma./cm.²
Type of germanium body 3 and resistivity _____ p-Type and resistivity, 1.8 ohm-cm.
Distance of germanium from jet face 2 _____ 75 microns.
Rate of flow of etchant ____ 4 ccs./min.
Inner radius $R_1$ of jet 1 ____ 0.3 mm.
Outer radius $R_2$ of jet 1 ____ 1.5 mm.

It has been found that the above method described does not give good results for the etching of n-type germanium and in order to achieve good results with the latter it has been found necessary to intensely illuminate the surface of the germanium to be etched to achieve an electropolished surface. It was found that with conditions otherwise the same as above, for the etching of n-type germanium of resistivity 0.3 ohm-cm., good results were obtained by focussing the light from a tungsten filament at 3000° C. on the surface to be etched, the incident flux being about 500 lumens/cm.². A convenient method of directing the light on to the germanium surface is to shine it down a glass tube, the light being retained in the tube by total internal reflection. This reduces the absorption of the near infra-red by the electrolyte.

Figure 3:
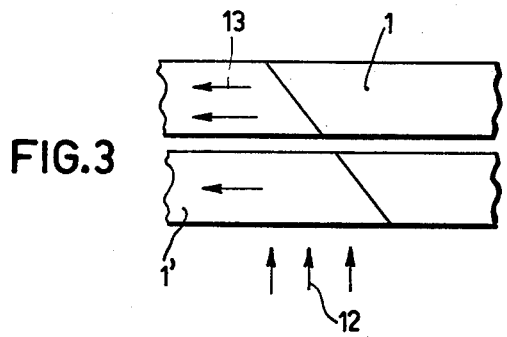
FIGURE 3 shows a modification of the jet of the apparatus of FIGURE 2 required for the etching of n-type germanium.

FIGURE 3 illustrates schematically one method of directing the light onto the germanium surface. This figure shows the glass jet divided into two parts 1 and 1', in a plane at 45° to its bore. The cut-surfaces are polished, silvered and cemented together. Light incident normally on the jet as indicated by arrows 12 will then be reflected and pass through the thick glass wall of the jet, parallel to the direction of flow of the electrolyte as indicated by arrows 13, and illuminate the surface of the germanium to be etched.

Best results were achieved with the use of sodium hydroxide solution as etchant as described above. However, ammonium chloride solution can be used but although this gives rise to an etched surface which is macroscopically flat the latter exhibits small depressions. With the apparatus described above, for the etching of p-type germanium with 20% ammonium chloride solution the following results were obtained.

| Thickness of Ge removed, microns | Distance moved to maintain pressure, microns | Etching current, milliamperes | Time (mins.) |
|---|---|---|---|
| 32 | 32 | 90 | 11 |
| 27 | 30 | 55 | 18 |
| 10 | 8 | 25 | 11 |

The details of the etching were as follows:

Distance of germanium from jet face _____ 75 microns.
Pressure across jet (constant to within 0.5 mm.) _____ 10 cms. of water.
Rate of flow of etchant _____ 4 ccs./min.
Inner radius of jet _____ 0.3 mm.
Outer radius of jet _____ 1.5 mms.
Current density _____ 250 ma./cm.².

The method according to the invention has an application in transistor manufacture where it is necessary to produce wafers of germanium or silicon of a specified thickness. This could be achieved by the method described, in two ways. One is to measure the thickness of the wafer before etching, to subtract from this the wanted thickness and to etch away the difference. Alternatively the surface of the specimen mount could be made flat and used as a reference plane, the distance moved to obtain equal pressures with and without the specimen present being measured. This method may lend itself to automatic operation.

Changes in temperature of the electrolyte theoretically should not affect the pressure appreciably since it can be shown that $$P = \frac{6 \log_e \frac{R_2}{R_1}}{\pi g h^3} \times \frac{V \pi a^4}{8l}$$

where $V$ is the pressure drop across the capillary 9, $a$ is the radius and $l$ is the length of the capillary. Thus $P$ is independent of $n$ (viscosity). All the remaining terms in the equation are largely unaffected by temperature changes.

If greater accuracy in the etching is required, a narrower channel between the body and the jet face can be used. The higher pressure obtained by this means can be backed off against a constant pressure in a differential manometer, and an accuracy of ±0.5 micron or better may be attained. For automatic indication of pressure changes, a differential capacitance gauge can be used (a sensitivity of 0.4 pf. per mm. water is obtainable); alternatively a lamp and photocell can be used with a water manometer.

What is claimed is:

1. A method of etching the surface of a body and removing a predetermined depth of material from the body, comprising arranging a nozzle close to but spaced from the surface of the body to define a channel between the end of the nozzle and the opposed body surface, forcing etchant capable of removing body material under a given pressure through the nozzle onto the body surface and through the said channel whereby material of the surface is removed widening the said channel, the nozzle being spaced at such a distance the body and the etchant flowing at such a rate that a slight widening of the said channel will cause a significant reduction in the pressure required to force the etchant through the said channel, continuing the said etchant flow while measuring the said pressure reduction due to widening of the channel, and terminating the etching when the pressure reduction reaches a value indicating the predetermined depth of material removal has been attained.

2. A method as set forth in claim 1 wherein the nozzle has a flat end face substantially parallel to the opposed body surface, and the etching is done electrolytically.

3. A method of etching the surface of a semiconductive body and removing a predetermined depth of material from the body, comprising arranging a fixed nozzle close to but spaced from the surface of a fixed body to define a channel between the end of the nozzle and the opposed body surface, forcing etchant capable of removing body material under a given pressure through the nozzle onto the body surface and through the said channel whereby material of the surface is removed widening the said channel, the nozzle being spaced at such a distance from the body and the etchant flowing at such a rate that a slight widening of the said channel will cause a significant reduction in the pressure required to force the etchant through the said channel, continuing the said etchant flow while measuring the said pressure reduction due to widening of the channel, and terminating the etching when the pressure reduction reaches a value indicating the predetermined depth of material removal has been attained.

References Cited by the Examiner

UNITED STATES PATENTS

| 2,532,907 | 12/50 | Hangosky | 204—143 |
| 2,532,908 | 12/50 | Hangosky | 204—143 |
| 2,739,935 | 3/56 | Kehl et al. | 204—143 |
| 2,827,427 | 3/58 | Barry | 204—224 |
| 2,844,531 | 7/58 | Prince | 204—143 |
| 2,846,346 | 8/58 | Bradley | 204—143 |
| 2,850,444 | 9/58 | Armstrong et al. | 204—143 |
| 2,875,141 | 2/59 | Noyce | 204—143 |
| 2,937,124 | 5/60 | Vaughn | 204—143 |
| 2,958,636 | 11/60 | Hershinger | 204—143 |
| 3,002,907 | 10/61 | Williams | 204—143 |

FOREIGN PATENTS 335,003  9/30  Great Britain.

OTHER REFERENCES

Bleiweiss, Metals and Alloys, November 1943, pages 1075–1080.

WINSTON A. DOUGLAS, *Primary Examiner.*

JOHN H. MACK, JOHN R. SPECK, *Examiners.*